Figure 2:
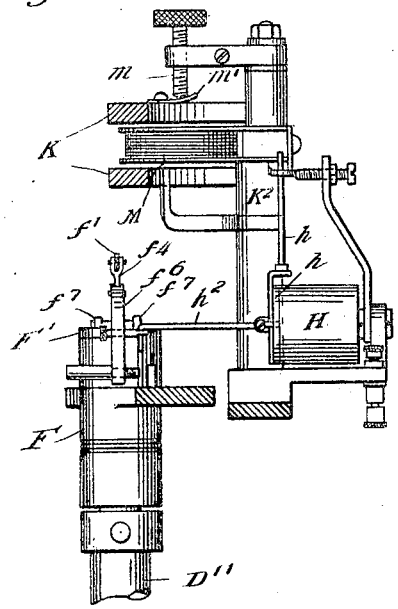

J. F. O'CONNOR.
MACHINE FOR TESTING AND REGISTERING OPERATION OF DRAFT RIGGINGS.
APPLICATION FILED MAR. 29, 1909.

935,162.

Patented Sept. 28, 1909.
5 SHEETS—SHEET 1.

Witnesses:
Wm. Geiger
H. W. Munday

Inventor:
John F. O'Connor
By Munday, Evarts, Adcock & Clarke.
Attorneys

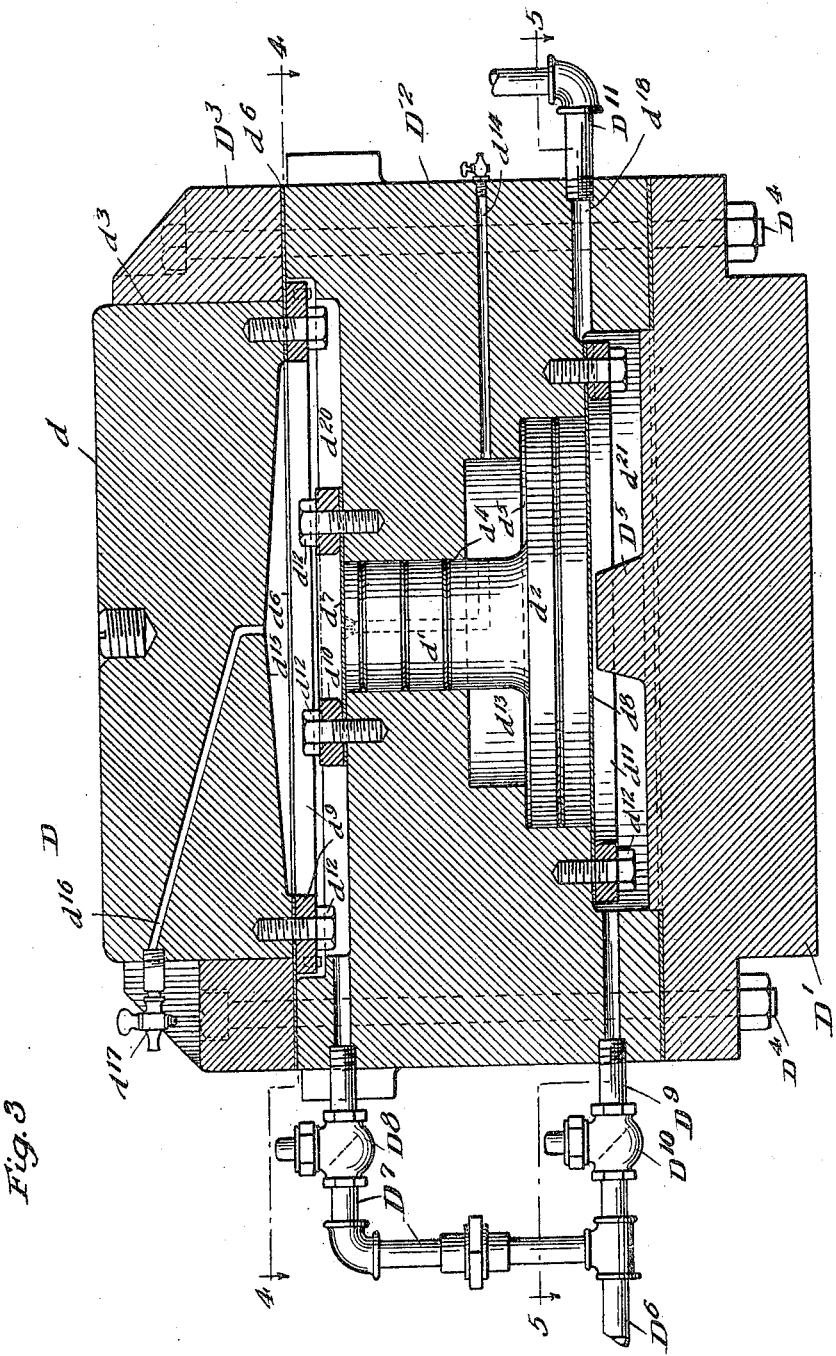

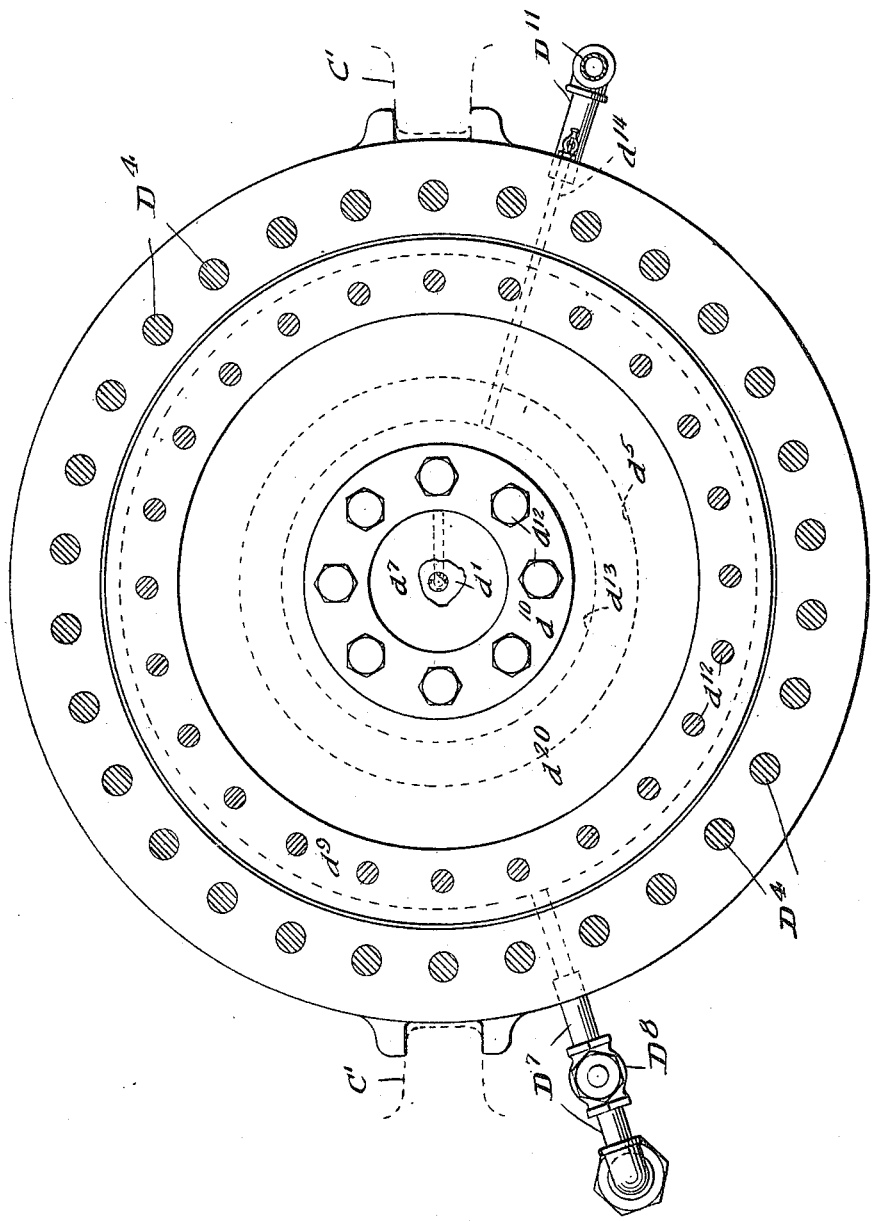

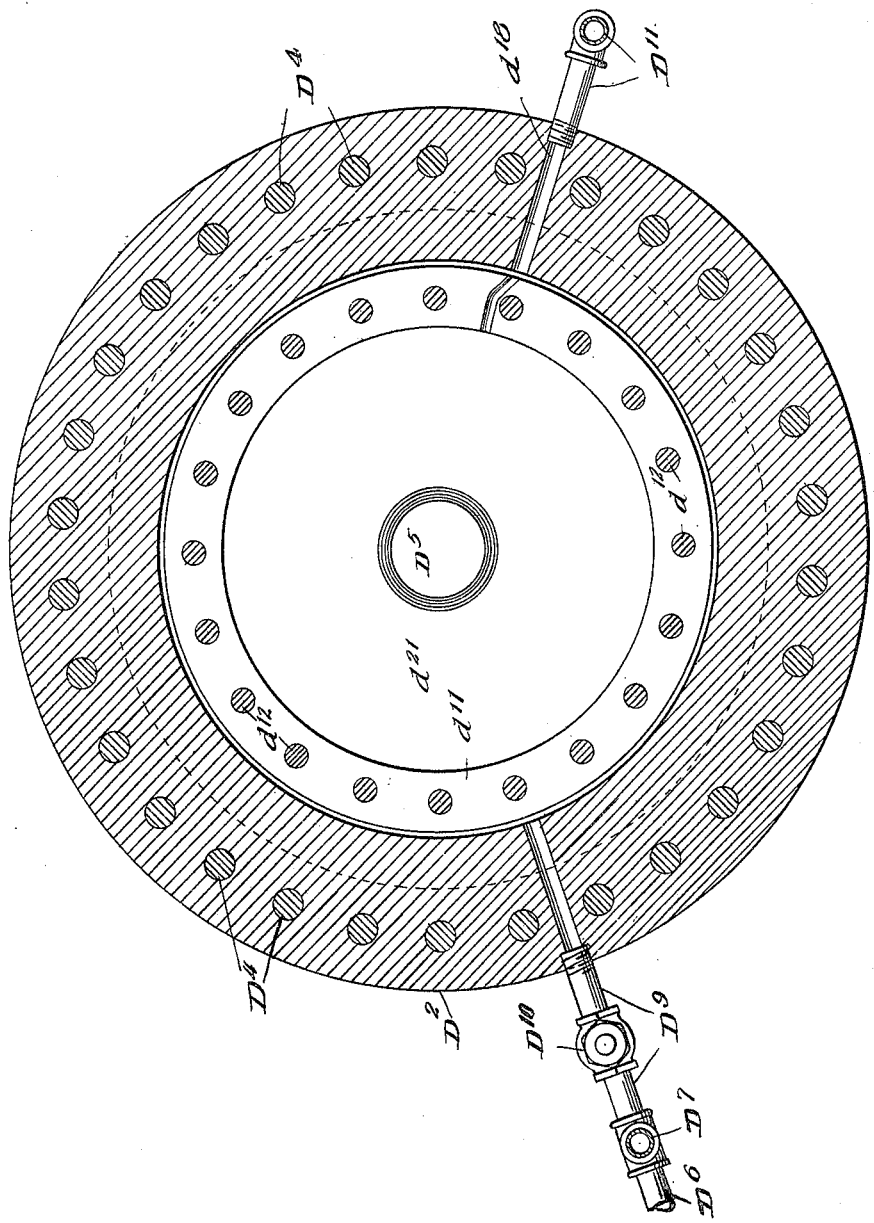

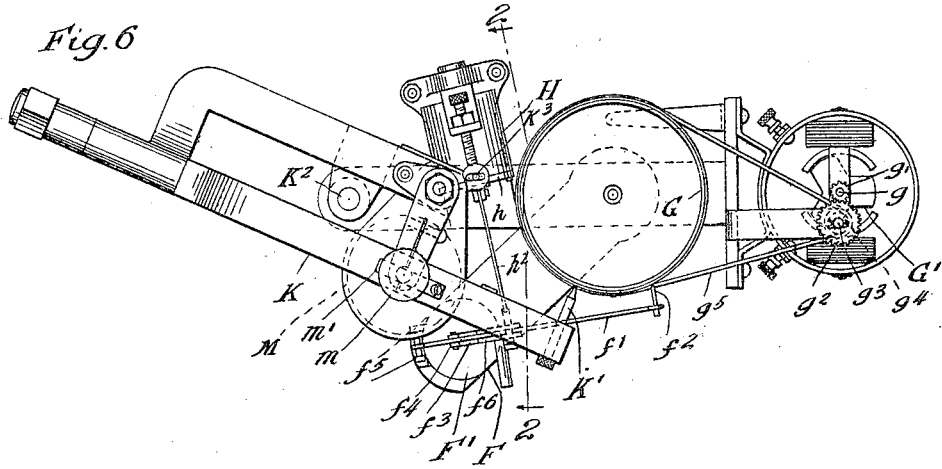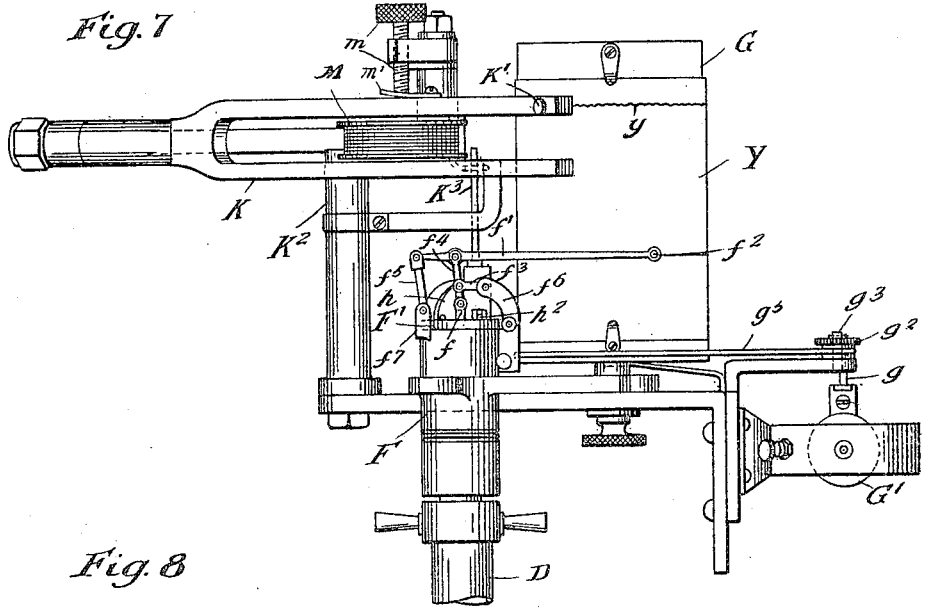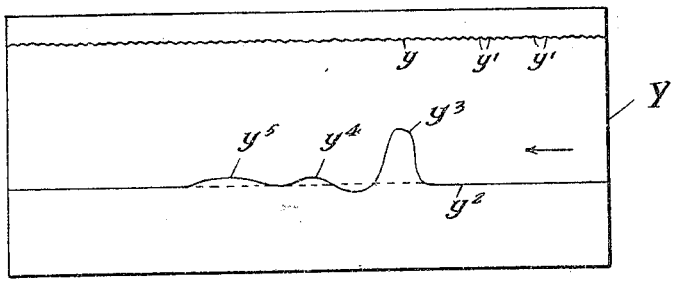

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

MACHINE FOR TESTING AND REGISTERING OPERATION OF DRAFT-RIGGINGS.

935,162. Specification of Letters Patent. Patented Sept. 28, 1909.

Application filed March 29, 1909. Serial No. 486,425.

*To all whom it may concern:*

Be it known that I, JOHN F. O'CONNOR, a citizen of the United States, residing in Chicago, in the county of Cook and State of Illinois, have invented a new and useful Improvement in Machines for Testing and Registering Operation of Draft - Rigging, of which the following is a specification.

My invention relates to machines for testing and registering the action of friction or other draft rigging under sudden shocks or blows.

The object of my invention is to provide a machine of a simple, efficient and practicable construction for accurately testing and registering the action of railway car draft rigging under sudden shocks or blows.

The machine embodying my invention comprises in coöperative combination an anvil, a drop or other hammer, a plurality of hydraulic dynamometer cylinders and pistons provided with flexible diaphragms permitting the transmission of pressure from the piston to the water in the cylinder and from one cylinder to the piston of the other, a water supply under pressure communicating with both of the hydraulic cylinders, and furnished with check valves, so that the same may remain certainly, normally and snugly full or inflated at the time the blow or shock is received and thus accurately transmit it to the pressure indicator and with the least possible movement of the pistons or of the water in the cylinders, a pressure indicator, a revolving paper holder, a recording finger or pencil actuated by the pressure indicator, a tuning fork, an electromagnetic vibrator for the tuning fork, a time recording finger or pencil carried by the tuning fork, and an electromagnet for instantaneously swinging or moving the time indicator finger or pencil and the pressure indicator finger or pencil simultaneously into contact with the moving paper or card on the revolving paper holder so that the operator may swing said pencils into recording position just before the hammer strikes the draft rigging on the upper hydraulic dynamometer piston, and thus cause said fingers or pencils to accurately register upon the card or paper on the paper holder, the action of the draft rigging under the blow of the drop hammer, the pencil carried by the tuning fork giving the time, and the pencil actuated by the pressure indicator giving the magnitude and characteristic of the shock imparted to the upper piston of the dynamometer through the draft rigging which is interposed between the dynamometer and the hammer.

Figure 1:
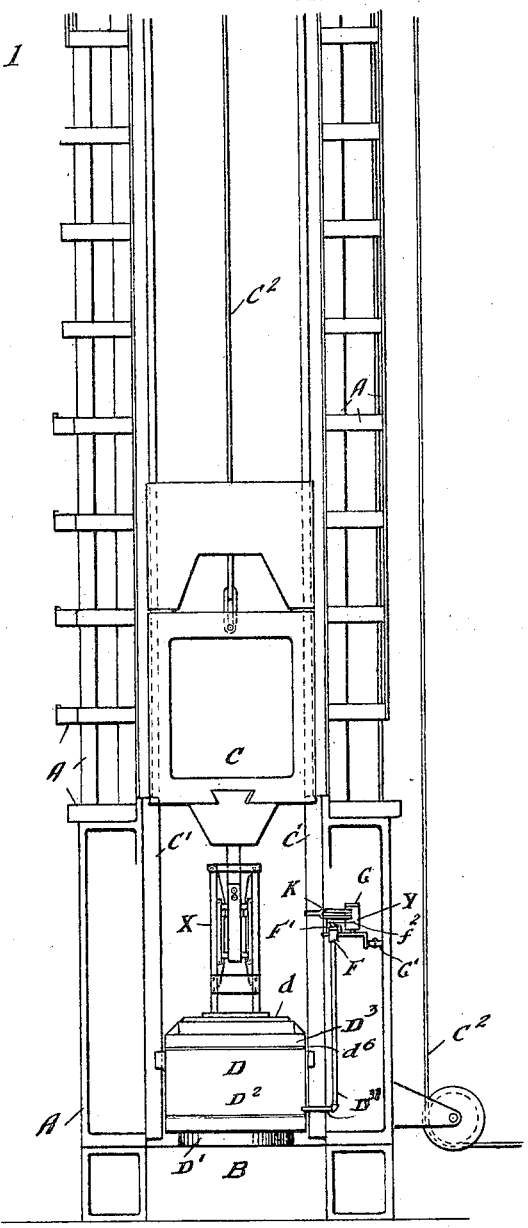

In the accompanying drawing forming a part of this specification, Figure 1 is a front elevation of a machine embodying my invention. Fig. 2 is a detail side elevation, partly in vertical section, showing the pressure indicator and a portion of the registering mechanism, the same being a section on line 2—2 of Fig. 6. Fig. 3 is a detail vertical section of the hydraulic dynamometer cylinders and pistons. Fig. 4 is a detail horizontal section on line 4—4 of Fig. 3. Fig. 5 is a detail horizontal section on line 5—5 of Fig. 3. Fig. 6 is a detail plan view of the pressure indicator and registering mechanism and Fig. 7 is a detail elevation. Fig. 8 is an elevation of the card Y showing the graphical record of the operation of the draft rigging as produced by the machine.

In the drawing, A represents the frame of the machine, B the anvil, C a drop or other hammer adapted to move up and down in suitable guides $C^1$ and to be raised by a rope or cable $C^2$.

The hydraulic dynamometer D which is interposed between the anvil B and the draft rigging X to be tested and its action or operation registered, comprises a bottom head $D^1$, a main casing $D^2$, an upper casing $D^3$, an upper piston $d$, an intermediate piston $d^1$, a reducing piston $d^2$, said casing being furnished with cylinder chambers $d^3$ $d^4$ and $d^5$ for said pistons and water chambers $d^{20}$ and $d^{21}$ and also with intervening diaphragms $d^6$ $d^7$ $d^8$ and clamping rings $d^9$ $d^{10}$ $d^{11}$ secured in place by screws $d^{12}$. The upper diaphragm $d^6$ is annular and is clamped between the casings $D^2$ $D^3$ by bolts $D^4$, and also at its inner portion to the piston $d$ by the clamp ring $d^5$. The intermediate diaphragm $d^7$ is a circular disk and is clamped to the casing $D^2$ surrounding the piston chamber $d^4$ by the clamp ring $d^{10}$. The lower diaphragm $d^8$ is likewise a circular disk and is clamped to the casing $D^2$ at the portion thereof surrounding the reducing piston $d^2$. The lower head $D^1$ of the dynamometer casing or cylinder is furnished with a central stop or boss $D^5$ to guard against undue downward movement of the reducing piston $d^2$ when not in use, or when the lower chamber $d$ is not filled with water. The intermediate piston $d^1$ which is preferably about one tenth the area of the reducing piston $d^2$ and said reducing piston are preferably made in one piece. The casing $D^2$ is preferably provided with a relief chamber $d^{13}$ above the reducing piston $d^2$ and with a bleeder or escape channel $d^{14}$ to prevent any accumulation of water or pressure between the diaphragms $d^7$ and $d^8$.

$D^6$ represents a water supply pipe from any suitable constant head or pressure of water. This water pressure supply pipe $D^6$ communicates with the upper hydraulic cylinder water chamber $d^{20}$ through a suitable connecting pipe $D^7$ furnished with a check valve $D^8$ to prevent any back flow of water from the hydraulic chamber $d^{20}$. The lower hydraulic chamber $d^{21}$ is in communication with the water head supply pipe $D^6$ through a connecting pipe $D^9$ having a similar check valve $D^{10}$. The upper piston $d$ is provided with a conical or dome shaped under face $d^{15}$ with the center of which communicates an upwardly inclined escape passage or port $d^{16}$ provided with a stop cock or valve $d^{17}$ which may be opened from time to time to make sure that the chamber $d^{20}$ is free from any trapped air or other compressible gas. When this cock is opened and water under the head of the supply pipe $D^6$ flows therefrom, the operator can be satisfied that there is no trapped air in the upper chamber of the dynamometer. To in like manner insure against any air being trapped in the lower hydraulic chamber $d^{21}$, an outlet passage or port $d^{18}$ leads therefrom to the pipe $D^{11}$ which leads to and communicates with the pressure indicator F. (See Fig. 5.)

The pressure indicator F may be of any well known or suitable construction. The indicator F is furnished at its upper end with a revolving ring or sleeve $F^1$ and its piston stem $f$ is provided with an indicator finger $f^1$ carrying a marker $f^2$ and connected to said piston stem $f$ by parallel motion links $f^3$ $f^4$ and $f^5$, said links $f^3$ and $f^5$ being pivoted to brackets $f^6$ $f^7$ on the swivel ring $F^1$ so that the indicator finger and its marker may be moved into and out of contact with the recording paper Y on the revolving paper holder or drum G. The indicator finger is so moved into contact with the moving paper on the paper holder instantaneously by means of an electromagnet H, the armature $h$ of which is connected with the swivel ring $F^1$ of the indicator by a connecting link $h^2$.

The paper holder G is preferably a revolving drum or cylinder and is preferably rotated at a substantially uniform speed by means of a small electric motor $G^1$, the shaft $g$ having a gear $g^1$ meshing with a gear $g^2$ on the shaft $g^3$ carrying a pulley $g^4$ connected with the paper holder drum by a belt or cord $g^5$.

K is a tuning fork carrying on one of its prongs a time register marker or finger $K^1$. The tuning fork is mounted to swing horizontally on an upright shaft or pivot $K^2$ so that its marker may be moved into and out of contact with the paper Y on the revolving paper holder G simultaneously with the pressure indicator finger $f$. The tuning fork is thus operated by an arm $K^3$ on the armature of the electromagnet H. The tuning fork is vibrated preferably by means of an electromagnet M, preferably arranged between the prongs of the tuning fork and furnished with a circuit breaker $m$ $m^1$, one contact point $m^1$ of the circuit breaker being carried on one of the prongs of the tuning fork so that the vibration thereof will make and break the circuit and thus keep the tuning fork under vibration. As the tuning fork vibrates at a perfectly constant rate, the up and down movements of the marker carried by the prong thereof make time registrations on the paper Y on the holder H, which in connection with the registrations made by the marker of the pressure indicator finger, show the magnitude of the shock or blow produced by the hammer upon the dynamometer through the interposed draft rigging and the time taken in its absorption. If the draft rigging properly cushions the blow of the hammer so as to absorb it in the two inch or such matter of movement that the cushioning devices of the draft rigging provide for, the total pressure registered by the pressure gage indicating marker will be materially and often several times less than the amount so registered in cases where the draft rigging does not properly cushion and absorb the blow. In other words, the draft rigging of the best and highest cushioning capacity with the same drop of the hammer will register the smallest resulting blow.

The time recording finger or marker which is mounted upon the tuning fork registers or records upon the paper minute fractions of a second, according to the number of vibrations that the tuning fork makes per second. In practice, I prefer to employ a tuning fork which will make, say, two hundred vibrations per second. The electromagnetic vibrator H for the tuning fork operates simply as an agitator therefor to keep it in vibration, but it will be of course understood that this electromagnet does not and cannot change the number of vibrations that the tuning fork makes per second. The time recording finger thus operates with absolute regularity and unaffected by the blow or shock produced by the hammer upon the anvil and surrounding mechanism or building in which it is located.

The several diaphragms $d^6$ $d^7$ $d^8$ are flexible and preferably of thin sheet metal or other suitable flexible material.

In operation, the draft rigging X being in place on the anvil and the hammer elevated, the operator after releasing the hammer, watches its descent, and just before it strikes the draft rigging, he touches the push button or switch controlling the operation of the electromagnet H and thus swings the markers $f^2$, $K^1$ into contact with the moving paper Y on the holder G, thus causing said marker $K^1$ to make a time registration $y$ upon the paper in minute fractions $y^1$ of a second, each minute fraction being one beat of the tuning fork, and these beats being at absolutely regular intervals and independent of any outer influences of the hammer or other causes. And at the same time, the pressure indicator marker $f^2$ makes a registration or record $y^2$ of the magnitude and characteristics of the shock, the marked elevation $y^3$ of the record line $y^2$ showing the maximum blow imparted to the draft rigging by the hammer, and the smaller elevations or undulations $y^4$ $y^5$ indicating subsequent shocks due to recoils as registered by the marker of the pressure indicator. The time record $y$, in connection with the pressure or shock record $y^2$ enables the engineer by suitable measurements and calculations to figure out all necessary data in regard to the operation of the draft rigging.

I claim:—

1. In a machine for testing and registering the action of draft rigging under sudden shocks or blows, the combination with an anvil, of a hammer, a plurality of dynamometer cylinders and pistons having intervening diaphragms, water pressure supply pipes communicating with the water chambers of said cylinders and furnished with check valves, a pressure indicator having a piston furnished with a recording finger, a revolving paper holder, a tuning fork furnished with a recording finger, a vibrator for said tuning fork and means for simultaneously moving the recording fingers of said tuning fork and pressure indicator into contact with the paper carried by said revolving paper holder as the hammer strikes the draft rigging on the anvil, substantially as specified.

2. In a machine for testing and registering the action of draft rigging under sudden shocks or blows, the combination with an anvil, of a hammer, a plurality of dynamometer cylinders and pistons having intervening diaphragms, water pressure supply pipes communicating with the water chambers of said cylinders and furnished with check valves, a pressure indicator having a piston furnished with a recording finger, a revolving paper holder, a tuning fork furnished with a recording finger, an electromagnetic vibrator for said tuning fork, means for revolving said paper holder and an electromagnet for simultaneously and instantaneously moving the recording fingers of said tuning fork and pressure indicator finger into contact with the paper carrier by said revolving paper holder as the hammer strikes the draft rigging on the anvil, substantially as specified.

3. In a machine for testing and registering the action of draft rigging under sudden shocks or blows, the combination with an anvil, of a hammer, a dynamometer casing having a plurality of water chambers and piston chambers and pistons, intervening diaphragms, clamping rings for said diaphragms, water pressure supply pipes communicating with the water chambers of said cylinders and furnished with check valves, a pressure indicator communicating with a reduced pressure water chamber of said dynamometer casing and having a piston stem furnished with a recording finger, a swivel ring upon which said recording finger is mounted, a revolving paper holder, a tuning fork furnished with a recording finger and adapted to swing toward said paper holder, means for vibrating said tuning fork and means for simultaneously moving the recording fingers of said tuning fork and pressure gage indicator into contact with the paper carried by said revolving paper holder as the hammer strikes the draft rigging on the anvil, substantially as specified.

4. In a machine for testing and registering the action of draft rigging under sudden shocks or blows, the combination with an anvil, of a hammer, a plurality of dynamometer cylinders and pistons having intervening diaphragms, water pressure supply pipes communicating with the water chambers of said cylinders and furnished with check valves, a pressure indicator having a piston furnished with a recording finger, a movable paper holder, and a time recording finger and means for operating same, substantially as specified.

5. In a machine for testing and registering the action of draft rigging under sudden shocks or blows, the combination with an anvil, of a hammer, a plurality of dynamometer cylinders and pistons having intervening diaphragms, water pressure supply pipes communicating with the water chambers of said cylinders and furnished with check valves, a pressure indicator having a piston furnished with a recording finger, a movable paper holder, a time recording finger and means for operating same, and means for moving said time recording finger and said pressure indicator finger simultaneously into contact with the paper carried by said paper holder as the hammer strikes the draft rigging on the anvil, substantially as specified.

6. In a machine for testing and registering the action of draft rigging under sudden shocks or blows, the combination with an anvil, of a hammer, a plurality of dynamometer cylinders and pistons having intervening diaphragms, water pressure supply pipes communicating with the water chambers of said cylinders and furnished with check valves, a pressure indicator having a piston furnished with a recording finger, a movable paper holder, a time recording finger and a tuning fork carrying said time recording finger, substantially as specified.

7. In a machine for testing and registering the action of draft rigging under sudden shocks or blows, the combination with an anvil, of a hammer, a plurality of dynamometer cylinders and pistons having intervening diaphragms, water pressure supply pipes communicating with the water chambers of said cylinders and furnished with check valves, a pressure indicator having a piston furnished with a recording finger, a movable paper holder, a time recording finger, a tuning fork carrying said time recording finger, and means for vibrating said tuning fork, substantially as specified.

8. In a machine for testing and registering the action of draft rigging under sudden shocks or blows, the combination with an anvil, of a hammer, a plurality of dynamometer cylinders and pistons having intervening diaphragms, water pressure supply pipes communicating with the water chambers of said cylinders and furnished with check valves, a pressure indicator having a piston furnished with a recording finger, a movable paper holder, a time recording finger, a tuning fork carrying said time recording finger, means for vibrating said tuning fork and means for moving both said recording fingers simultaneously into contact with the paper carrier by said paper holder as the hammer strikes the draft rigging on the anvil, substantially as specified.

9. The combination with a dynamometer casing having a plurality of concentric, in-series-acting water chambers, a main piston and an intermediate piston and a reducing piston, and water pressure supply pipes communicating one with each of said water chambers and furnished each with a check valve, substantially as specified.

10. The combination with a dynamometer casing having a plurality of concentric, in-series-acting water chambers, a main piston and an intermediate piston and a reducing piston, water pressure supply pipes communicating one with each of said water chambers and furnished each with a check valve, and diaphragms between said water chambers and said pistons, substantially as specified.

11. The combination with a dynamometer casing having a plurality of concentric, in-series-acting water chambers, a main piston and an intermediate piston and a reducing piston, water pressure supply pipes communicating one with each of said water chambers and furnished each with a check valve, diaphragms between said water chambers and said pistons, and clamp rings for said diaphragms, substantially as specified.

12. The combination with a dynamometer casing having a plurality of concentric, in-series-acting water chambers, a main piston and an intermediate piston and a reducing piston, water pressure supply pipes communicating one with each of said water chambers and furnished each with a check valve, and diaphragms between said water chambers and said pistons, the diaphragm between the main piston and the upper water chamber adjacent thereto being annular, substantially as specified.

13. The combination with a dynamometer casing having a plurality of water chambers, a main piston and an intermediate piston and a reducing piston, water pressure supply pipes communicating with said water chambers and furnished with check valves, diaphragms between said water chambers and said pistons and clamp rings for said diaphragms, the diaphragm between said main piston and the water chamber adjacent thereto being annular, and the clamp ring therefor extending beyond the peripheral edge of the piston, substantially as specified.

14. The combination with a dynamometer casing having a plurality of water chambers, a main piston and an intermediate piston and a reducing piston, water pressure supply pipes communicating with said water chambers and furnished with check valves, and diaphragms between said water chambers and said pistons, said casing having a bottom head furnished with a stop for the reducing piston, substantially as specified.

15. The combination with a dynamometer casing having a plurality of concentric, in-series-acting water chambers, a main piston and an intermediate piston and a reducing piston, water pressure supply pipes communicating one with each of said water chambers and furnished each with a check valve, and diaphragms between said water chambers and said pistons, said main piston having an escape port furnished with a stop cock and communicating with the water chamber adjacent to said main piston, substantially as specified.

16. The combination with a dynamometer casing having a plurality of concentric, in-series-acting water chambers, a main piston and an intermediate piston and a reducing piston, water pressure supply pipes communicating one with each of said water chambers and furnished each with a check valve, diaphragms between said water chambers and said pistons and a pressure indicator communicating with the reduced pressure water chamber of said casing, substantially as specified.

17. The combination with a dynamometer casing having a plurality of concentric, in-series-acting water chambers, a main piston and an intermediate piston and a reducing piston, water pressure supply pipes communicating one with each of said water chambers and furnished each with a check valve, diaphragms between said water chambers and said pistons and a pressure indicator communicating with the reduced pressure water chamber of said casing, and said reduced pressure water chamber having an escape port leading to the communication between said chamber and said pressure indicator, substantially as specified.

JOHN F. O'CONNOR.

Witnesses:
SEARL ABRAMS,
H. W. MUNDAY.